(12) United States Patent
Elkind et al.

(10) Patent No.: US 9,215,386 B2
(45) Date of Patent: Dec. 15, 2015

(54) DETECTOR PIXEL SIGNAL READOUT CIRCUIT USING AN AC SIGNAL COMPONENT IN IMPLEMENTING AN EVENT DETECTION MODE PER PIXEL

(75) Inventors: Shimon Elkind, Carmiel (IL); Elad Ilan, Western Galilee (IL); Roman Dobromislin, Haifa (IL)

(73) Assignee: SEMI CONDUCTOR DEVICES—AN ELBIT SYSTEMS—RAFAEL PARTNERSHIP, Haifa (IL)

( * ) Notice: Subject to any disclaimer, the term of this patent is extended or adjusted under 35 U.S.C. 154(b) by 248 days.

(21) Appl. No.: 13/440,537

(22) Filed: Apr. 5, 2012

(65) Prior Publication Data
US 2012/0261553 A1  Oct. 18, 2012

(30) Foreign Application Priority Data

Apr. 13, 2011 (IL) ......................................... 212289

(51) Int. Cl.
*H04N 5/343* (2011.01)
*H04N 5/335* (2011.01)
*H04N 5/3745* (2011.01)

(52) U.S. Cl.
CPC ............... *H04N 5/343* (2013.01); *H04N 5/335* (2013.01); *H04N 5/3745* (2013.01)

(58) Field of Classification Search
CPC ....... G01J 1/44; G01J 1/46; G01J 2001/4406; H01J 40/14; H01J 40/12; H03F 3/08; H03F 3/087; H01L 27/02; H01L 27/10; H01L 27/102; H01L 31/09; H01L 2027/10
USPC ..... 250/208.1, 214 R, 214.1, 214 C, 214 SW, 250/214 DC; 348/272, 281–283, 294, 297, 348/302, 307, 308, 311, 332; 257/290–293, 257/298, 300, 414, 431, 443, 444; 356/3, 356/3.02, 3.04, 3.11, 3.12, 3.13, 4.01–5.15
See application file for complete search history.

(56) References Cited

U.S. PATENT DOCUMENTS

| 6,069,377 A | 5/2000 | Prentice et al. |
| 6,253,161 B1 | 6/2001 | Arias-Estrada |
| 6,678,039 B2 * | 1/2004 | Charbon ...................... 356/5.01 |

(Continued)

FOREIGN PATENT DOCUMENTS

JP  A-2003-134396  5/2003

OTHER PUBLICATIONS

Nesher et al., "High-performance IR detectors at SCD present and future," *Opto-Electronics Review*, vol. 14, No. 1, p. 59-68, 2006.
Leijtens Johan et al., Smart FPA's: are they worth the effort, Proceedings of Spie, Jan. 1, 2006, pp. 636115-636115-9, vol. 6361.
Chi Y M et al.; CMOS Camera With In-Pixel Temporal Change Detection and ADC, IEEE Journal of Solid-State Circuits, Oct. 1, 2007, pp. 2187-2196, vol. 42, No. 10.

(Continued)

*Primary Examiner* — Georgia Y Epps
*Assistant Examiner* — Carolynn A Moore
(74) *Attorney, Agent, or Firm* — Browdy and Neimark, PLLC

(57) ABSTRACT

A pixel readout circuit for use with an imaging pixel array, comprising: an input channel for receiving an image signal corresponding to an electrical output of a photosensitive element of the pixel; and an electronic circuit interconnected between an input channel and an output readout utility. The electronic circuit comprises a capacitive unit, and a single analyzer. The capacitive unit is controllably linked to the input channel for accumulating a charge corresponding to received intensity generated by the pixel during a single frame period, and is connected to the output readout utility.

26 Claims, 14 Drawing Sheets

(56) References Cited

U.S. PATENT DOCUMENTS

| | | | |
|---|---|---|---|
| 7,135,680 B2 * | 11/2006 | Elkind et al. | 250/332 |
| 8,258,451 B2 * | 9/2012 | Vampola et al. | 250/214 A |
| 2002/0176067 A1 | 11/2002 | Charbon | |
| 2009/0086071 A1 | 4/2009 | Kagawa et al. | |
| 2010/0176275 A1 | 7/2010 | Vampola et al. | |

OTHER PUBLICATIONS

Carley R L et al.; Integrated Sensor and Rangefinding Analog Signal Processor, Proceedings of the Custom Integrated Circuits Conference, May 13, 1990, pp. 711-716, New York USA.

* cited by examiner

DETECTOR PIXEL SIGNAL READOUT CIRCUIT USING AN AC SIGNAL COMPONENT IN IMPLEMENTING AN EVENT DETECTION MODE PER PIXEL

FIELD OF THE INVENTION

This invention is in the field of detector pixel signal readout and processing.

REFERENCE

The following reference is considered to be pertinent for the purpose of understanding the background of the present invention:
1. O. Nesher and P. Klipstein, "High performance IR detectors at SCD present and future", Proceedings of SPIE vol. 5957, Infrared Photoelectronics, August. 2005, pp 0S1-OS12

BACKGROUND

Photonic detector devices respond to received photons by creating an electric effect which can be quantified and hence provide information on the flux of the received photons. Focal plane arrays (FPAs) of detectors are used to obtain images of objects, whereby each detector provides a pixel in the image array. In the image, each pixel is provided with a unique address and a numeric value, which can further be used for manipulating the image for extracting information from the image.

A trade-off between imaging parameters is a compromise often imposed for obtaining desirable image parameters. Accordingly, an increase in the image frame rate at the expense of image resolution or image size is known in the art.

Multi-mode sensors have become an important component in various applications, such as surveillance systems and search-and-track systems, etc. To ensure accuracy and proper target acquisition, it has become increasing more useful to obtain as much information as possible about the region of interest being imaged, such as, for example, detecting and tracking a potential target.

One common example of a multi-mode imaging device is a missile seeker that combines mid-wave infra-red imaging capability and semi-active laser detection and tracking. Infrared imaging allows for tracking based on emitted heat or expected heat signature of a target, while a semi-active laser (SAL) detector allows the detection of a target being painted with a laser spot. With all of these advantages, there are several downsides to a multi-mode detector device. Generally, such devices require two or more disparate sensor systems whose outputs are combined and analyzed to give a true multi-mode detection capability. This causes such systems to generally be costly and complicated, limiting their use in the field.

General Description

There is a need in the art for a novel pixel readout circuit for use with an imaging pixel array. This is associated with the following:

Modern electro-optical systems are designed towards more compact, low power, and low cost systems compared to traditional systems. Integration of several components or functionalities, such as thermal imager, laser designator, laser range finder (LRF), into one multi-function detector can serve this trend. LRF becomes an increasingly vital component to high precision targeting engagements for the imaging system user. The precise and accurate range-to-target information is an essential variable in the fire control solution of today's sophisticated weapons. Handheld military range-finders normally operate at ranges of 2 km and up to 5 km, and have about ±10 m range accuracy. The more powerful models of range-finders measure a distance of up to 25 km and are normally installed either on a tripod or directly on a vehicle or gun platform. In the latter case, the range-finder module is integrated with a thermal night vision and daytime observation system. Lasers are also used extensively as Light Detection And Ranging (LIDAR) for 3-D object recognition. With the recent advances of LIDAR technology, the accuracy potential of LIDAR data has significantly improved. Conventional LIDAR systems can provide a pulse repetition rate of up to 100 kHz, and range measurement accuracy of a few centimeters.

Modern electro-optical systems contain several components such as a thermal imager, laser designator, laser range finder, etc. The demand for compact systems with low power consumption and low cost can be addressed by incorporating some of the traditional system abilities into the IR detector.

The present invention provides a pixel readout integrated circuit (ROIC) to be integrated with an active matrix light detector (photodiode) of any type creating an advanced multi-function infrared detector with on-chip processing. The present invention also provides a new type of detector comprising a Readout Integrated Circuit (ROTC) with advanced on-chip signal processing. For example, the ROTC incorporating a high level of signal processing, may be a flip chip-bonded to a 640×512 InSb detector array of 15 µm pitch.

There is thus provided a pixel readout integrated circuit to be integrated with an active matrix light detector (photodiode) of any type. For example, the active matrix detector may be a focal plane array detector (pixel matrix) made of materials sensitive to IR imaging (for example InSb, InAsSb, InGaAs, CMT, etc.), mid-wave IR imaging or short wave IR imaging or long wave IR imaging. The pixel readout is performed in an integrated circuit on-chip. The readout circuit is configured and operable to receive the entire pixel matrix detection data and to process the detection data to provide a single-pixel detection of an event at the focal plane identified as existence of an input pulse signal. More specifically, the readout circuit is capable of simultaneously or almost simultaneously implementing two different modes, an imaging mode and an event detection mode per pixel, which is implemented by processing data of the same frame. In the single-pixel event detection mode, the readout circuit identifies a specific event as a positive change in photocurrent, which might be indicative of the existence of a laser pulse or weapon fire pulse being any electromagnetic radiation pulse converted to current by the detector element. Due to the fact that such fast event detection is carried out concurrently with acquiring an image of the same frame, the fast event is not only detected but its location in the frame being imaged from the region of interest can also be determined, and, moreover, at the pixel-size resolution.

Therefore, according to one broad aspect of the present invention, there is provided a pixel readout circuit for use with an imaging pixel array. The pixel readout circuit comprises: (a) an input channel for receiving an image signal corresponding to electrical output of a photosensitive element of the pixel; (b) an electronic circuit interconnected between the input channel and an output readout utility, the electronic circuit comprising: (i) a capacitive unit comprising at least one capacitor, controllably linked to the input channel for accumulating a charge corresponding to a received intensity generated by the pixel during a single frame period, and connected to the output readout utility for transmitting image data thereto, and (ii) a signal analyzer unit controllably linked to the input channel for receiving and analyzing at least a part of the image signal generated by the pixel during the single frame period, and connected to the output readout utility.

The analysis of at least a part of the image signal generated by the pixel during a single frame period comprises detection of temporal changes in the accumulated current during the single frame period (corresponding to the intensity of the received signal), and comparing the magnitude of change to a preset threshold level. If the magnitude of change is greater than a predetermined condition (threshold), the signal analyzer unit generates data indicative of the detected event and transmits the data to the output readout utility.

In this connection it should be noted that if the change in signal intensity (the photo-current derivative) is larger than a predefined threshold (predetermined condition), an event is detected. The exact values depend on application trade-offs such as False-Alarm-Rate or power.

In some embodiments, the electronic circuit is configured to selectively vary conversion gain of the capacitive unit to provide a selected integration time of charge accumulation by at least one capacitor during a single frame period, thereby selectively providing different image acquisition modes with respectively higher and lower signal to noise ratio of the pixel operation.

In some embodiments, the pixel readout circuit comprises a switching assembly connected to the input channel and configured for selectively directing at least a part of the image signal to one or more units of the electronic circuit.

In some embodiments, the signal analyzer unit comprises a comparator configured and operable to determine a change in the amount of accumulated charge corresponding to the received intensity of the image signal by measuring a voltage difference.

In some embodiments, the signal analyzer unit is configured and operable to determine a time profile of accumulation of the charge corresponding to the received intensity of the image signal during the frame, and generating data indicative of a distance to a location in the region of interest originating the detected event.

In some embodiments, the signal analyzer unit comprises a time counter circuit measuring the time profile and generating data indicative of the distance by measuring a time of flight to the detected event. In this connection, it should be noted that the time counter circuit is an electronic circuit located on-chip. It may be internal to the pixel circuit or external to the pixel circuit. The time counter circuit may comprise a voltage ramp, a switch and a readout capacitor.

According to another broad aspect of the invention, there is provided a pixel readout circuit for use with an imaging pixel array, where the readout circuit comprises: (a) an input channel for receiving an image signal corresponding to electrical output of a photosensitive element of the pixel; (b) a plurality of electronic units, each electronic unit being interconnected between the input channel and a common output readout utility, each electronic unit being configured and operable for carrying out a different imaging mode by applying a different processing to at least a part of the same image signal; (c) a switching assembly comprising a plurality of switches, the switching assembly being connected to the input channel and controllably operable for selectively linking the input channel to one or more of the electronic units to thereby selectively direct at least a part of the image signal to one or more of the electronic units; and (d) a control system connected to the switching assembly and configured and operable to selectively activate one or more of the switches to perform the link between the input channel and the one or more different electronic units.

In some embodiments, the detector of the present invention can be operated in either one of the following four different modes of operation. The first operation mode is thermal imaging which may have functionalities and performance of a Mid-Wave IR imaging (MWIR) detector. The second operation mode is a dual-function mode that includes both thermal imaging and information on Asynchronous Laser Pulse Detection (ALPD) for each pixel. The detection probability of a laser pulse is significantly increased by integrating a dedicated in-pixel circuit for identifying a fast-changing signal by its temporal profile. Since each pixel has internal processing to identify pulses of electromagnetic radiation, it is possible also to measure the elapsed time between a trigger and the detection of a pulse. This yields a third mode of operation in which the detector is synchronized to a pulse source (e.g. laser) and becomes a Two-dimensional Laser Range Finder (TLRF). The fourth operation mode is dedicated to Low Noise Imaging (LNIM) for example for the Short Wave Infrared (SWIR) band, where the IR radiation signal is low. It can be used in either passive or active imaging.

In some embodiments, the readout circuit is also configured and operable to selectively operate in one of the multiple different modes of operation (one at a time). The readout circuit receives the pixel output current and generates processed data according to the selected mode of operation. The readout circuit carries out multiple different data processing modes, providing different types of information about a region of interest from which an image stream is collected. To this end, the readout circuit has multiple (typically four) separate data processing channels, each having its own electronic circuit.

The readout circuit comprises a switching assembly (appropriate arrangement of switches) which is responsive to the photo-diode input and is controllably operable to selectively switch one or more of the electronic circuits. To this end, the switching assembly defines a different input circuit characterized by predetermined conversion gain corresponding to the operational mode to be performed by the selected electronic circuit. Generally, for any imaging mode, the readout circuit is typically characterized by a predefined conversion gain, i.e. conversion of the input of the readout circuit (charge corresponding to output of the photodiode) to the output of the readout circuit (voltage). Such conversion gain is typically defined by capacitance of the readout circuit.

In some embodiments, one of the electronic circuits comprises a capacitive unit comprising at least one capacitor, controllably linked to the input channel for accumulating a charge corresponding to at least a part of the image signal generated by the pixel during a single frame period, and connected to the output readout utility for transmitting image data thereto.

The integrated readout circuit of the present invention integrated within an imaging pixel array provides a multi-mode detection system detecting image data in multi-mode from a single set of optics and detection components. These different modes can functionally be defined as follows:

a) regular imaging being an image acquisition mode by a pixel matrix, where all the pixels are concurrently exposed to light from a region of interest and their electrical outputs are detected and further read out.

b) low noise imaging being an image acquisition mode which differs from regular imaging by significantly higher conversion gain and thus higher signal to noise ratio for relatively weak signals. This mode is implemented by using a much smaller integration capacitor. In other words, a ratio between the conversion gains of the regular imaging and low noise imaging modes is high, e.g, a few order of magnitude. Low noise imaging utilizes a very high charge to voltage conversion ratio for the entire pixel matrix detection data.

c) event detection and spatial location of the event in the frame (at a focal plane in a 2D space) by a single pixel and single frame period. This mode allows for detection of an occurrence of an event as well as for determining a location of the certain event in the region of interest. The event detection input circuit is configured and operable to detect the charge accumulation for any given pixel during a single frame period and identify sudden changes in the rate of accumulation. The input circuit therefore detects current changes in real-time. The event is detected by measuring a current change indicative of a radiance change (e.g. laser pulse, gunshot, etc.) during each frame. In some embodiments, the change in current is detected by measurement of the current derivative instead of integrating the current.

d) time scale event location (electromagnetic pulse) and registration of the time of the event. The event location mode is implemented by detecting a distance to the event (via the time of flight measurement) for a given orientation of the pixel matrix with respect to the region of interest. In order to correctly measure the distance, the time of flight measurement is specifically triggered by a trigger unit interconnected between the photodiode and a time counter circuit including the corresponding switch of the readout circuit. A signal from the photodiode, while being generated, concurrently actuates the trigger unit. This mode thus enables range finding based on "time of flight" measurements, utilizing a starting point set by the trigger unit. The trigger unit activates a time counter circuit configured and operable to measure distances.

In both modes (c) and (d), the DC component of the detected signal is removed by using a band pass filter. Accordingly, a variation in the AC component in the frequency band of interest is detected, thus increasing sensitivity of the event detection and location (in space and time).

In some embodiments of the present invention, the readout circuit is capable of performing any combination of modes (a) to (d) including all these modes.

In other embodiments of the present invention, the readout circuit is capable of performing a combination of modes (a) and (b), namely regular imaging mode and a low noise imaging mode. Each of these modes is implemented in a snapshot fashion, namely simultaneously by all the pixels in the detector pixel matrix. Regular imaging and low noise imaging may be implemented alternatively (one at a time) using significantly different conversion gains for these modes. Typically, the ratio between the gains of the regular imaging mode and of the low noise imaging mode differs by three orders of magnitude. Therefore, these different imaging modes are suitable for different applications and different spectral ranges. The readout circuit is thus capable of hybrid spectrum detection.

In another embodiment of the present invention, the readout circuit is capable of performing a combination of modes (b) and (d), namely using the output of a low-noise detection circuit as input to the range finding circuit calibration.

In some embodiments, one of the electronic circuits comprises a signal analyzer unit controllably linked to the input channel for receiving and analyzing at least a part of the image signal generated by the pixel during the single frame period, and connected to the output readout utility. Analyzing at least a part of the image signal generated by the pixel during the single frame period comprises determining a change in an amount of accumulated charge corresponding to the received at least part of the image signal, and upon detecting that the amount of the accumulated charge satisfies a predetermined condition, generating data indicative of a detected event and transmitting the data to the output readout utility.

In some embodiments, at least one of the electronic circuits is configured and operable to acquire an image signal in a snapshot manner.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

The present invention provides a pixel readout circuit to be integrated within an imaging pixel array, wherein the readout circuit is capable of simultaneously or almost simultaneously implementing (i.e. by processing data of the same frame) particular modes, the use of which can depend on characteristics of the input signals transferred to the readout circuitry from the detector, or can depend on the characteristics of the output signal required from the readout circuitry.

Figure 1A:
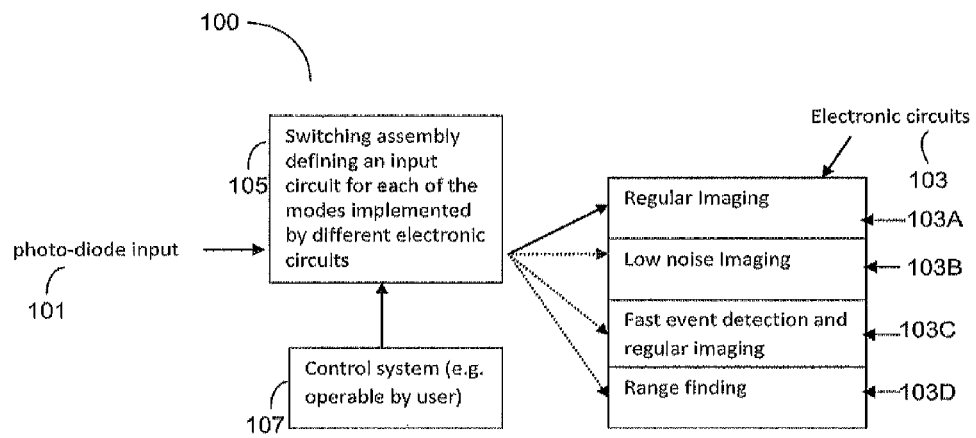
FIGS. 1A-1B are general schematic functional layouts of the integrated readout circuit of the present invention.

Reference is made to FIG. 1A, illustrating a pixel readout circuit 100 to be integrated within an active matrix light detector (photodiode array) of any type. For example, the active matrix light detector may be different types of InSb FPA with formats of 320×256, 480×384 and 640×512 elements and with pitch sizes in the range of 15 to 30 p.m. The photodiode array may be InSb diodes produced in the process described in [1] (planar technology). To enable the various functions of the ROIC, the pixel circuit of the present invention includes a set of switches, capacitors, amplifiers and memory. By controlling switches and bias levels inside the pixel, different functions can be implemented according to the predefined modes of operation.

In some embodiments, the readout circuit 100 comprises a plurality of electronic circuits 103; an arrangement of switches 105 connected to each electronic circuit (103A-103D); and a control system 107 connected to the arrangement of switches 105 and configured and operable to selectively activate one or more different electronic circuits 103A-103D. Each electronic circuit 103A-103D is configured and operable to receive an image signal from the imaging pixel array 101 defining an input channel. The integrated readout circuit 100 receives continuously the entire pixel matrix detection data from the input channel 101 corresponding to electrical output of photo-diode array and generates processed data by using a digital output processor according to a selected mode of operation, each mode of operation being activated by a different electronic circuit 103A-103D. The control system 107 is configured and operable to selectively switch between different modes of operation (at least one at a time) defined by different electronic circuits 103A-103D.

The readout circuit 100 thus carries out multiple different data processing modes, providing different types of information about a region of interest from which an image stream is collected. To this end, the readout circuit has multiple (typically four) separate data processing channels 103A-103D, each having its own electronic circuit. The switching assembly 105 (appropriate arrangement of switches) is responsive to the input channel 101 (e.g. photo-diode data) and is controllably operable to selectively switch one or more of the electronic circuits 103A-103D. The switching assembly 105 is configured and operable to activate a different input circuit characterized by conversion gain corresponding to the operational mode to be performed by the selected electronic circuit.

The digital ROTC of the invention may have at least one of the following modes of operation, which can functionally be defined as follows: (i) Standard IR Imaging (SIM) or regular imaging mode 103A being an image acquisition mode by a pixel matrix, where all the pixels are concurrently exposed to light from a region of interest and their electrical outputs are detected and further read out; (ii) low noise imaging mode 103B being an image acquisition mode which differs from regular imaging by significantly higher signal to noise ratio (on the price of maximal number of electrons that can be accumulated); (iii) event detection mode 103C by a single pixel and single frame; (iv) time scale event location mode 103D (electromagnetic pulse) in which the time of the event is registered. The readout circuit 100 is capable of performing a combination of (i) to (iv).

Figure 1B:
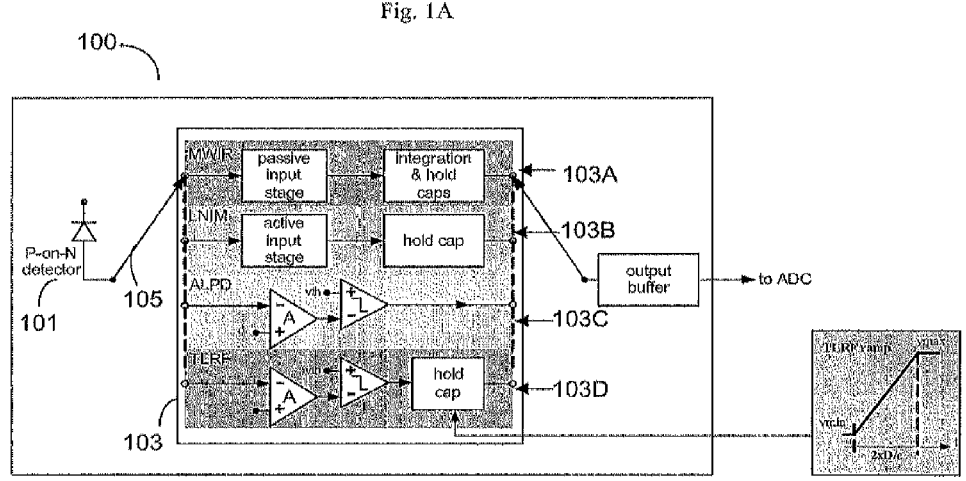

Reference is made to FIG. 1B illustrating a general schematic overview of the functional element of the readout circuit. The detector 101 generates charge carriers in response to photons incident upon the detector 101. In this specific but non-limiting example, the detector is based on P-on-N structure. It should, however be understood that the present invention is not limited to this example, and the detector may utilize an N-on-P structure, as well as any other suitable configuration. The charge produced by the charge carriers generated by the detector causes a voltage change across the detector 101. This voltage change produces the input signal (photodiode data) to the readout circuit, which then outputs a current or charge representative of the input signal. For example, when the input signal has a particular magnitude, the readout circuit can function in a first mode in which the input signal can be amplified to a measurable level, and when the input signal has another magnitude, the readout circuit can function in an alternate mode in which the input signal can be read out with a different amplification. Furthermore, more than one mode can be used to read out/process the same input signal. In some embodiments, selection of the mode of operation of the readout circuit may be actuated manually or automatically. For example, the control system may enable automatic selection of an appropriate mode of operation of the readout circuit.

In this figure, the different modes are defined as follows: (i) regular imaging mode 103A, for example Mid-Wave IR imaging (MWIR) in which the input circuit is denoted as passive input stage; (ii) Low Noise (very high gain) input stage (LNIM) 103B in which the input circuit is denoted as active input stage; (iii) event detection mode 103C by a single pixel and single frame defined as Asynchronous Laser Pulse Detection (ALPD); (iv) time scale event location mode 103D (laser pulse) in which the registration of the time of the event is defined as a Two-dimensional Laser Range Finder (TLRF).

In this connection, it should be noted that in the passive input stage the circuit has components incapable of controlling current by means of another electrical signal. The low noise input stage has an active input stage in which the circuit components have the ability to electrically control electron flow through them (electricity controlling electricity).

The event detection mode is able to detect any type of accidental pulse, not previously known, asynchronously with the image acquisition.

All the processed output signals are transferred to an output buffer module also referred hereinafter as a readout utility transferring the processed signal data to an ADC.

Figure 2:
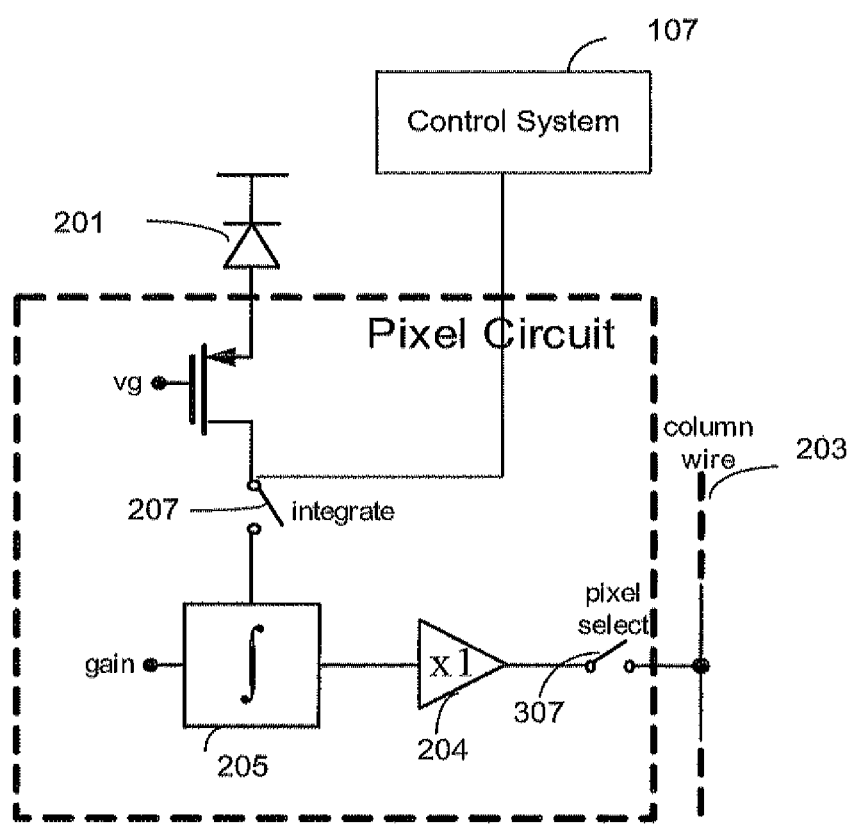
FIG. 2 is a possible schematic configuration of the regular imaging mode of the integrated readout circuit of the present invention.

Reference is made to FIG. 2 representing a possible pixel architecture configuration for a regular imaging mode. This mode is an image acquisition mode by a pixel matrix, where all the pixels are concurrently exposed to light from a region of interest and their electrical outputs are detected and further read out. The circuit of FIG. 2 corresponds to a single pixel within an array of pixels. The control system 107 activates this mode by closing the integration switch 207. An input signal produced by photodetector 201 is provided via an input channel to a capacitive unit including an integrated capacitor 205 and is integrated over a certain period of time (integration time). For example, the integration capacitor 205 has a full well capacity of a few Million electrons (Me). The pixel signal may be read via a direct injection (DI) readout circuit to an internal capacitor. The integrated capacitor 205 may comprise two readout capacitors selectable by the control system 107 via serial communication. The two readout capacitors may have significantly different capacitance values. The large capacitor may be read in both Integrate Then Read (ITR) and Integrate While Read (IWR) modes, while the smaller capacitor is only operative in the ITR mode.

Preferably, the regular imaging mode, as well as other modes (as will be described further below) utilizes snapshot integration. In other words, the pixel cell structure is configured to allow the simultaneous integration of the pixel array, thereby providing a "snapshot" image (concurrent signal acquisition and synchronization by all the pixels in the matrix). The control system 107 is configured to provide voltage readout, and to selectively switch between the following operational modes: Integration Then Read (ITR) and Integration While Read (IWR). A readout utility 204 connected in series to the capacitive unit, receives the processed image signal data from the capacitor 205 and transfers the processed signal data to the column wire 203 via switch 307. The integration time may be flexible for constant scene dimension, e.g. higher than 0.5 µs.

Figure 3:
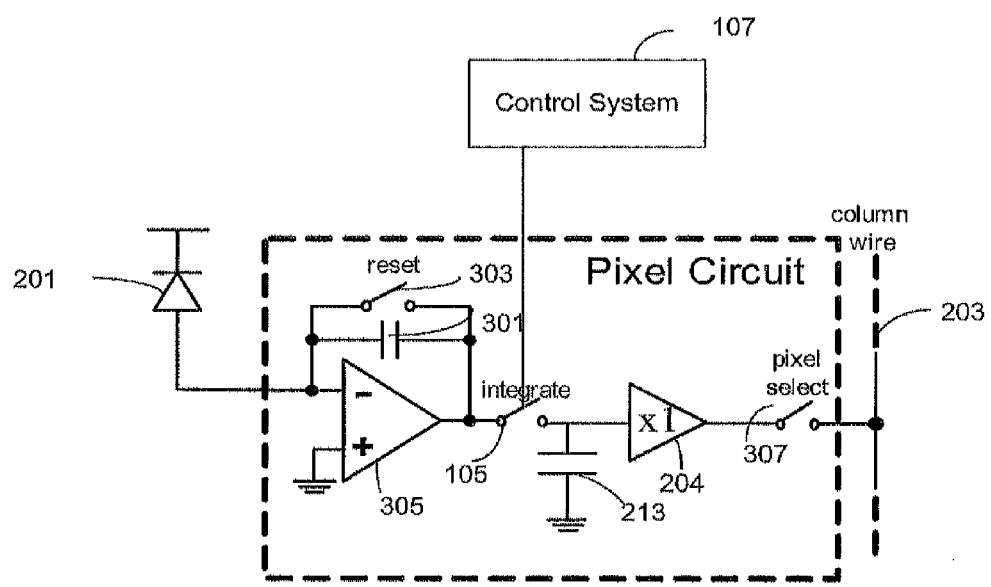
FIG. 3 is a possible schematic configuration of the low noise mode of the integrated readout circuit of the present invention.

Reference is made to FIG. 3 illustrating a possible schematic configuration of the low noise imaging mode pixel design. This mode is a high gain mode configured for low flux scenarios. In this mode, the photodiode current feeds a Capacitive Trans-Impedance Amplifier (CTIA) stage 305. The CTIA stage 305 enables the use of an extremely small capacitor (tens of Ke), and provides a stabilized diode bias. For low flux application, detection of an extremely low dark current is required. Hence, an improved InSb fabrication process for the low dark current detection may be implemented, and the detector may be operated at 68K. Alternative options may be implemented in order to achieve low dark current. For example, using detecting material such as InGaAs, HOT CMT or InAsSb barrier diodes that can be operated at higher operating temperatures while keeping low enough dark current. This mode may also be used for operation with high flux and extremely short integration times (e.g. synchronous laser illumination scenarios in active imaging).

In this case, the low dark current is not required. Similarly to the circuit of FIG. 2, the circuit of FIG. 3 corresponds to a single pixel cell within an array of such pixels. The low-noise, high-sensitivity mode is achieved by effectively activating a switched capacitor integrator (holding capacitor) 213 to replace the capacitor integrator 205 having higher capacitance than the holding capacitor. This mode is an image acquisition mode which differs from regular imaging by significantly higher signal to noise ratio for weak signals. An input signal produced by photodetector 201 is provided to the "−" input of an amplifier (e.g. capacitive transimpedance amplifier CTIA) 305. Feedback capacitor 301 connected in parallel to the amplifier 305 provides a feedback path for the amplifier 305. A reset switch 303, connected in parallel to the capacitor 301 and the amplifier 305, resets the photodetector 201 when closed. A switch 307 when closed provides an output path to a column wire 203. The amplifier 305 has a differential input, enabling to directly control a detector bias voltage by maintaining the input signal produced by photodetector 201 at a reference level. The input signal is then fed to the capacitive unit including the holding capacitor 213 and is integrated over a predetermined time interval (integration time). The size of the holding capacitor varies, since it stores the output voltage of the CTIA. The charge is accumulated inside the CTIA 305, in a much smaller capacitor (tens of Ke). The low-noise mode is thus different from regular imaging by a significantly higher integration time (smaller capacitance). A ratio between the conversion gains of the regular imaging and low noise imaging modes is high, e.g. a few orders of magnitude. The low noise imaging utilizes very high charge to voltage conversion ratio for the entire pixel matrix detection data. Typically the ratio between the gains of the regular imaging mode (FIG. 2) and of the low noise imaging mode (FIG. 3) differs by three orders of magnitude. Therefore, these different imaging modes, regular and low-noise, are suitable for different imaging applications and/or different spectral ranges.

The low noise mode may have full matrix frame rates up to 250 Hz (13-bit). The control system 107 is configured to provide an Integration Then Read (ITR) operational mode. A readout utility 204, connected in series to the holding capacitor 213, receives from the holding capacitor 213 the processed low noise image signal data and transfers the processed signal data to the column wire 203 via switch 307. The detector of the present invention is thus capable of hybrid spectrum detection. The minimal integration time is relatively short, e.g. of the order of a few 1 µs.

The control system 107 may thus selectively activate (close) the integration switch 207 (of FIG. 2) or the high gain integration switch 105 (of FIG. 3) in an alternative manner e.g. per frame such that one switch is closed at one time. The closing of the integration switch 207 activates the capacitive unit e.g. the regular imaging acquisition circuit including the integrated capacitor 205 as illustrated in FIG. 2, while the closing of the high gain integration switch 105 activates the low noise imaging acquisition mode circuit including the holding capacitor 213 as illustrated in FIG. 3. In this connection, it should be understood that the circuits illustrated in FIGS. 2 and 3 can be combined in the same circuit.

Figure 4:
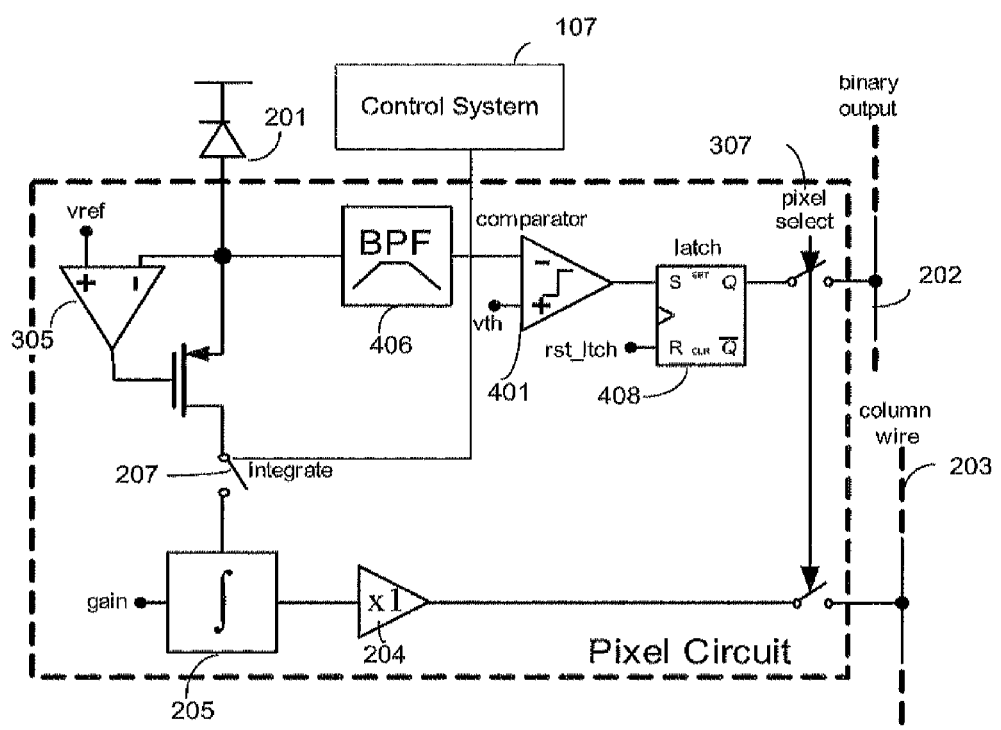
FIG. 4 is a possible schematic configuration of the event detection mode in combination with the regular imaging mode of the integrated readout circuit of the present invention.

Reference is made to FIG. 4 illustrating a possible configuration of the event detection mode by a single pixel, single frame. This event detection (ALPD) mode is designed to detect short light pulses (asynchronous), while providing an IR image simultaneously. An internal circuit detects short bursts of incoming flux. For each pixel, a designated bit indicates whether a burst was detected since the previous readout. The internal circuit is configured and operable to provide improved sensitivity as compared to detection of a laser spot by image processing. This is due to the fact that the detection circuit is hardly affected by the signal noise. The photodiode signal in the ALPD mode is read via a Buffered Direct Injection (BDI) circuit (not shown) to an internal capacitor. Also in this mode, two different integration capacitors may be available. In this case, the IWR mode is available only for the large capacitor, while the ITR mode is available for both capacitors. The BDI circuit enables improved diode bias stabilization compared to the direct injection (DI) readout, which is necessary at the sharp flux changes induced by the electromagnetic pulse. However, BDI implementation comes at the cost of reducing the dynamic range (for each capacitor) by almost a third with respect to the SIM mode, and increased power consumption. In this mode, the image is thus captured with a different input stage (BDI). The rest of the features and parameters of this imaging mode are similar to the regular imaging mode.

The readout circuit is thus capable of performing event detection by single-pixel and single-frame mode and thus enables location of the event in the frame.

This mode is implemented in every pixel. The event detection input circuit comprises a signal analyzer unit including a comparator configured and operable to detect the charge accumulation or a change in the charge accumulation for any given pixel during a single frame period and identify sudden changes in the rate of accumulation.

The input circuit therefore detects current changes in real-time. An event (e.g. laser pulse) is detected by measuring a current change indicative of a radiance change during each frame. The change in current is detected by measuring the current derivative instead of integrating the current by inputting the current into a band pass filter (BPF) 406. The BPF 406 removes the DC component of the input signal of the photodiode 201. Accordingly, the AC component is detected, thus increasing sensitivity of the event detection and location (in space and time). In this connection, it should be noted that the 2D event detection (location in space) is provided by all the pixels of the detector together and that no processing is required. The signal is then analyzed by the signal analyzer unit including a comparator and a flip-flop circuit. The circuit of FIG. 4 represents the single pixel readout within an array of pixels. For the implementation of the event detection mode, the control system 107 operates the capacitive unit (e.g. active input circuit) by closing switch 207. The event/pulse detection can thus be carried out simultaneously with the regular imaging mode. The regular imaging signal data is provided to the readout utility 204 via the capacitive unit 205. For example, each pixel outputs 15-bit scene data for the regular imaging and 1-bit for the pulse detection.

The event detection circuit includes the regular imaging acquisition circuit of FIG. 2. The operation of a regular imaging acquisition circuit is described above. As for the event detection circuit, it operates as follows: an input signal produced by photodetector 201, which might include an event signal originated in the region of interest within the same frame, is provided to signal analyzer unit including a comparator 401 and a flip-flop circuit 408. The input signal is provided to the integrating capacitor 205 as described in connection with FIG. 2 and is integrated over a predetermined period of time. The part of the acquired image data, that might include an event signal, enters a comparator 401 via the BPF 406. In order to have fast pulse detection, the comparator 401 should be configured to detect as small as possible voltage difference between its inputs "+" and "−". The comparator 401, transfers the event signal data which is outputted in the form of a binary output in the binary output channel 202. For example the flip-flop circuit 408 can be a RS (reset-set) latch. It can be constructed from a pair of cross-coupled NOR logic gates. The stored bit is present on the output marked Q. While the S and R inputs are both low, feedback maintains the Q and $\overline{Q}$ outputs in a constant state, with $\overline{Q}$ being the complement of Q. If S (Set) is pulsed high while R (Reset) is held low, then the Q output is forced high, and stays high when S returns to low; similarly, if R is pulsed high while S is held low, then the Q output is forced low, and stays low when R returns to low. Therefore flip-flop circuit 408 is configured to lock the event until it receives a reset signal from the control system 107. Switches 307 provide an output path to column wire 203 when closed.

This mode enables to detect pulses shorter than ~10 is with substantially no lower limit.

Figure 5:
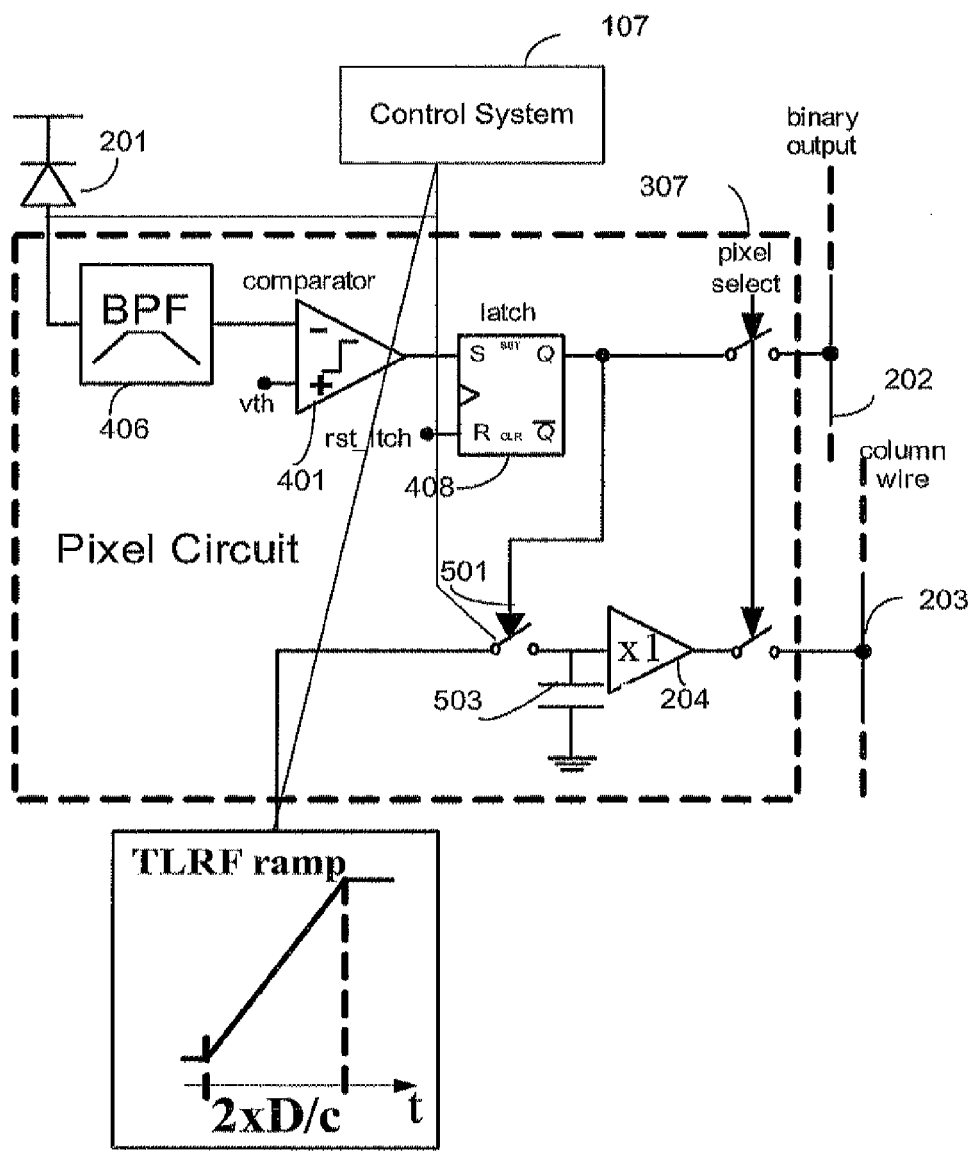
FIG. 5 is a possible schematic configuration of the event detection mode and the range finding mode of the integrated readout circuit of the present invention.

Reference is made to FIG. 5 illustrating a possible configuration of the time scale event location (laser pulse) mode and of the registration of the time of the event. This mode enables a range finding based on "time of flight" measurements, utilizing a starting point set by a trigger unit. The time scale event location mode is implemented by detecting a distance to the event (via the time of flight measurement), for a given orientation of the pixel matrix with respect to the region of interest. Such distance provides a time profile of the pulse. The distance may be determined by emitting a pulse of light and measuring the delay until it returns, or by measuring a phase difference between emitted and reflected radiation.

The time scale event location mode circuit includes the detection mode circuit of FIG. 4 for detecting an event which is to be located in a time scale and a time counter circuit for locating the pulse event in a time scale. The time counter circuit comprises a TLRF ramp, switch 501 and readout capacitor 503. In other words, the event time scale location is initiated by the trigger unit, which is actuated by the input signal from the photodiode, when the input signal is being generated, or is actuated by the event detection circuit via comparator 401. More specifically, if the event occurs, the input signal which contains the pulse causes the comparator signal to reach the threshold voltage "vth" defined by the control system 107 and the ramp value is sampled by the TLRF ramp. The control system 107 is connected to the switch 501 which becomes closed in response to the thresholded output of the comparator 401 (i.e. as a result of identification of the event signal).

The control system 107 comprises a "laser-fired" trigger unit (not shown) generating continuously a sequence of pulsed beams toward a target. If a reflected beam returns from the target, the photodiode 201 receives the reflected beam, and the voltage corresponding to the received reflected signal is fed into the comparator 401 via the BPF 406; if the certain voltage threshold is reached, the trigger unit generates the trigger signal to sample the time value. The timer counter circuit including a TLRF ramp is triggered by the trigger unit for every laser pulse. The control system 107 determines the adequate slope of the TLRF ramp. The time counter circuit measures continuously the time for the pulse of radiation to travel to the target and return. The time delay is continuously converted into voltage by the ramp conversion curve. In order to put the time scale event location mode in operation, the control system 107 operates to close the switch 501. As described above, when the certain voltage threshold is reached on the comparator 401, the control unit 107 closes the switch 501 and the voltage value of the ramp is accumulated and sampled on capacitor 503 until the next laser pulse. The capacitor 503 stores the ramp voltage at the time the pulse is detected.

Therefore, the readout capacitor voltage becomes proportional to the time of flight. This time of flight measurement is used by the readout utility 204 to determine a distance to the event using a ramp conversion curve. The readout utility 204 receives the processed event detection data from the comparator 401 and concurrently receives the processed event location data. The readout utility 204 drives the sampled ramp voltage outside of the pixel matrix via column wire 203, for digitization. Then the readout utility 204 operates to transfer these data to the binary output channel 202. As can be understood and also seen in the figures, the binary output channel 202 is selectively operable for receiving/transmitting output data associated with the event detection and location and/or time scale location via the flip-flop circuit 408. The data is thus output from the readout circuit of the invention via both the binary output channel 202 and column wire 203 in parallel. Thus, after the image acquisition stage, the pixel array is readout in a parallel way, with two buses (202 and 203) per column. This mode is implemented in every pixel.

In the TLRF mode, no thermal image is created. As described above, the time counter circuit, dedicated to each pixel, measures the elapsed time between the "laser-fired"

trigger (which is input to the detector), and the instance in which the reflected laser beam was detected by the pixel. Thus a 2D range map of the view is created. In this mode, the power consumption is relatively high. Therefore, an operation at a sub-window may be implemented. It should be noted that conventionally, the laser spot of a laser range finder covers only a few tens of pixels in the image. Hence operating this mode in a sub-window of 32×32 pixels is normally sufficient. The number of sub-windows and their location in the array can be changed via serial communication. In this mode, the pixel readout circuit provides two outputs: an event time (voltage), and an event detection (binary).

Figure 6:
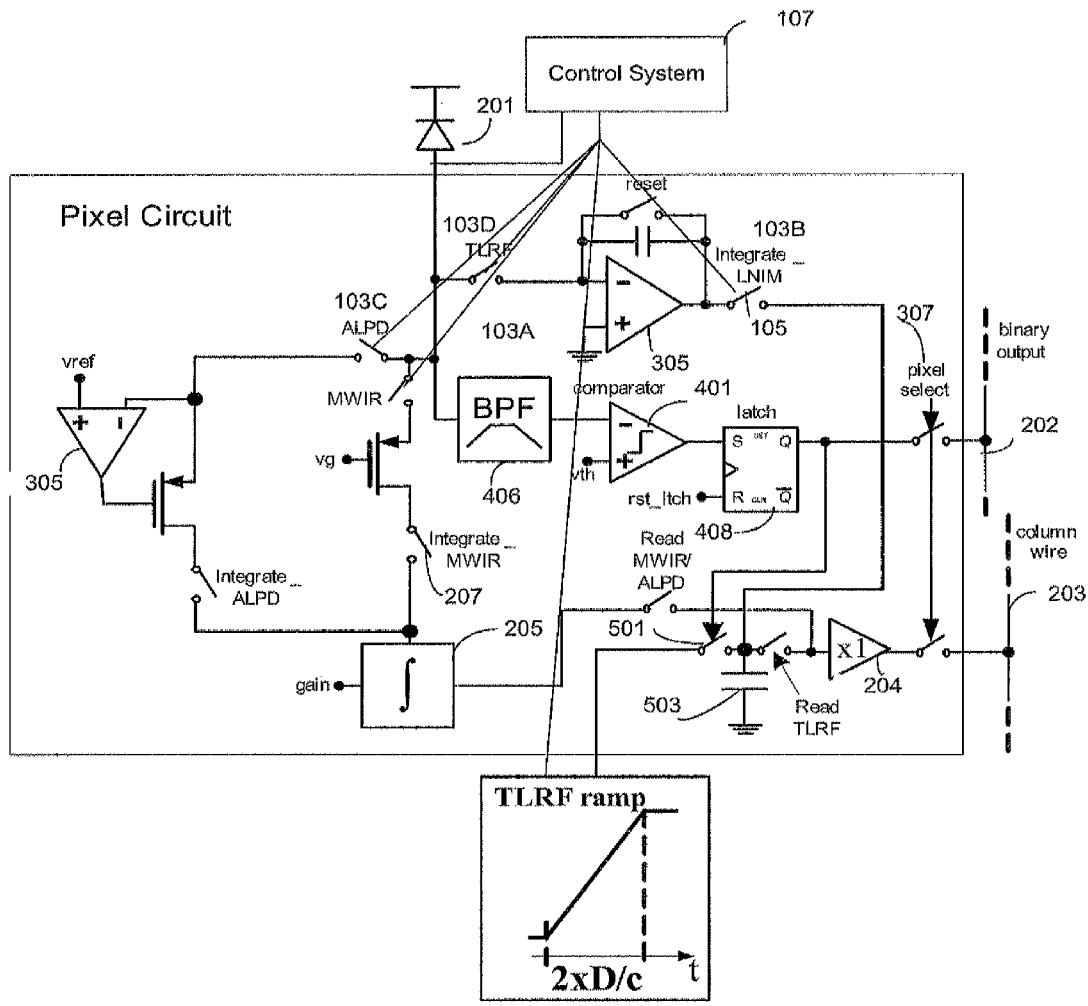
FIG. 6 is a possible schematic configuration of the integrated readout circuit of the present invention in which four different detection modes are concurrently implemented.

Reference is made to FIG. 6 illustrating an implementation of the four modes in the same circuit. The figure is self-explanatory. The control system 107 selectively opens/closes one or more switches (103A-103D) to activate/deactivate one or more of the imaging modes alternatively or concurrently as detailed above.

In some embodiments, the control system 107 can direct the output of the low noise detection circuit per frame to the input of the range finding circuit calibration, such that the output of the low noise detection circuit is processed at one frame to calibrate another frame. It is thus possible to switch between the modes TLRF, LNIM, ALPD on a frame to frame basis. This allows a design of flexible operating sequence that meets the application requirements.

Utilizing the detector of the present invention in an IR system may give rise to the following advantages:

A system that has both short wave infrared (SWIR) and "classic" thermal (MWIR) imaging capabilities gives better battlefield orientation and information. SWIR images are produced by photons reflected from the scene, similar to visible-band images; therefore, interpretation by an observer is more intuitive than an emission image in the MWIR band. Analysis and field tests with the detector of the present invention show substantial advantage of SWIR-band imaging in the frequent scenario of just-less-than-perfect atmospheric conditions. Basically, for a given aperture, the visible-band resolution and therefore image-quality should be better than image quality in longer wavelength-bands like the SWIR or MWIR bands. However, this is not true when real and frequent atmospheric conditions are taken into consideration. Both the SWIR and MWIR bands are more penetrative through particles than the visible band. However, per given aperture, the MWIR spatial resolution is much lower than the visible band. This is exactly the "sweet point" where the SWIR stands: it has, per given aperture, about two to three times better spatial resolution than the MWIR band, alongside better atmospheric penetration than the visible band. Furthermore, when considering the turbulence effects on the visible band image, the SWIR band may become the user's first choice. Using the same detector for both MWIR and SWIR bands, while properly designing the optical-system, can give almost perfect registration between the two bands. This cannot be easily achieved by using two separate detectors, the first for the MWIR and the second for SWIR (e.g. InGaAs matrix), due to inherent retention limitations of two separate optical paths. Furthermore, a one-detector solution for both bands results in an overall lower cost system.

Moreover, the ALPD mode of the detector of the present invention gives true "see-spot" (laser designator spot detection) capability to the system. In current available systems, see-spot capability is achieved by accumulating laser spot photons together with scene thermal photons on the same FPA pixels; therefore, these systems suffer from relatively limited see-spot ranges in scenes with high-level background. The detector of the present invention discriminates between "normal" image photons that are emitted or reflected continuously from the object (to create the ordinary scene) and photons that originated from laser designator pulses. The unique discrimination mechanism of the detector of the present invention enables to see laser spots easily, even in a scene where the laser photons are "drowned" in the rest of the scene signals. Another conventional technique that is used to enable laser spot imaging is adding a CCD or a CMOS camera with a very narrow bandpass filter around the 1.06 µm wavelength. There are two drawbacks to this method: (a) It is useful only during daylight, when the user can see the scene behind the laser spot. (b) Trying to digitally project the spot image into an MWIR image may suffer from retention limitations, and the necessity of field calibrations to overcome them. The detector of the present invention gives a direct and true image of laser spots over the ordinary scene with zero retention effect: the user always sees substantially exactly where the laser is aiming, even for small targets.

Another advanced capability of the detector of the present invention is the TLRF mode. In order to implement a laser-range-finder with this mode, the system designer needs to add only a pulsed-laser source to its system without the need for another detector. The rest of the work is done by the detector of the present invention, thus simplifying and cost-reducing the system, with a key advantage over current solutions: the user sees the exact object that is being (range) measured. This is achieved due to the fact that the same pixels that are used for thermal imaging are those that are measuring the time of flight. This feature enables the system to measure distances for targets as small as humans, since there is no fear of boresight retention effects, which occur in current systems that use a separate LRF and thermal imager. When an appropriate optical system is designed, the system analysis of the TLRF mode shows that using pulsed-lasers, similar to those currently used in available systems on the market, gives equivalent ranges to current traditional solutions with an Avalanche Photo Detector (APD) at the receiver.

Figure 7:
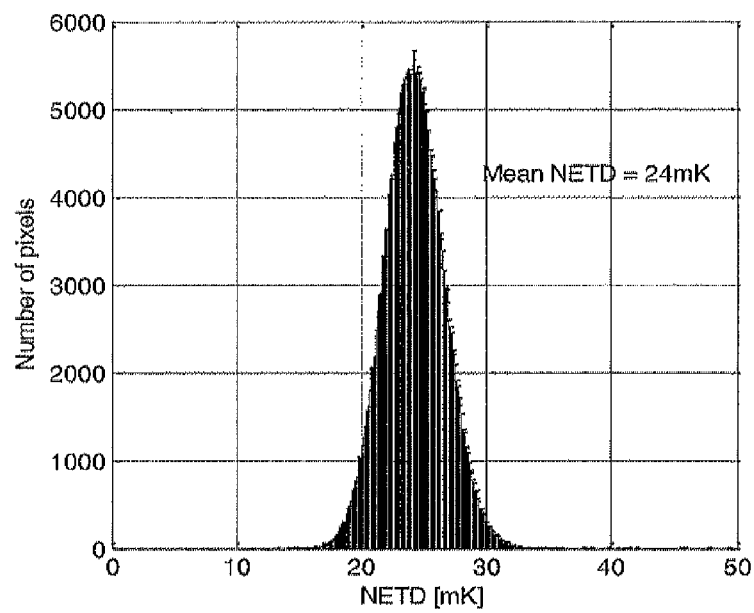
FIG. 7 presents a Noise Equivalent Temperature Difference (NETD) histogram in the regular imaging mode of the integrated readout circuit of the present invention.
Figure 8:
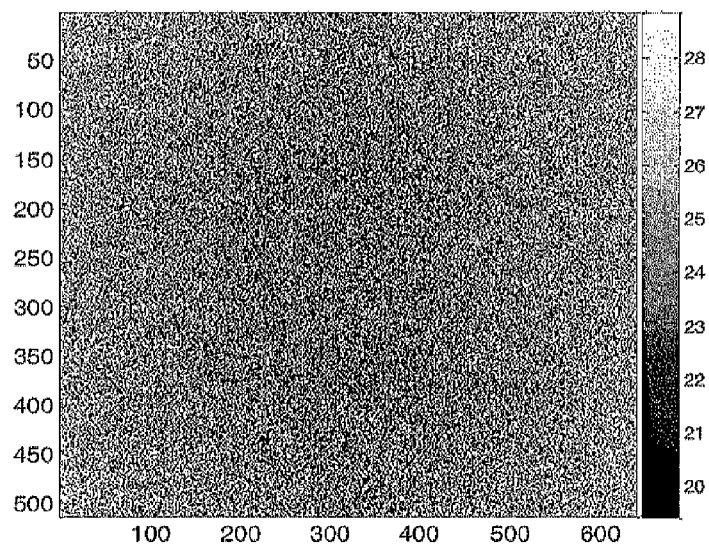
FIG. 8 presents a Noise Equivalent Temperature Difference (NETD) 2D distribution in the regular imaging mode of the integrated readout circuit of the present invention.
Figure 9:
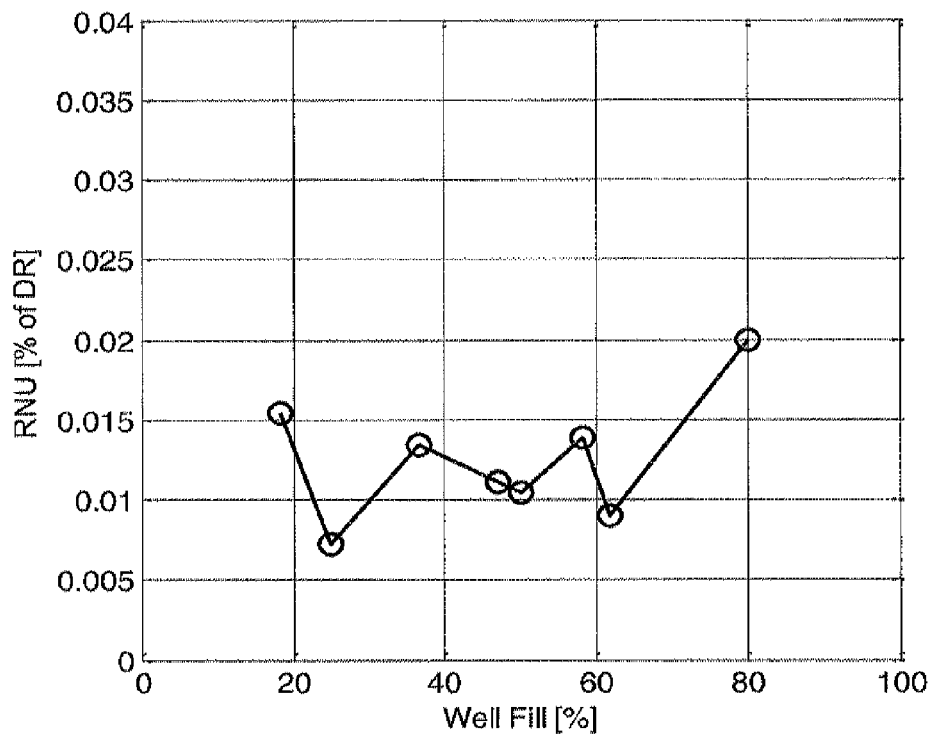
FIG. 9 presents a global Residual Non-Uniformity (RNU) in the regular imaging mode of the integrated readout circuit of the present invention as a function of well fill.

Reference is made now to FIGS. 7-9, presenting performance results of the detector of the present invention in the regular imaging mode characterized in a laboratory Dewar. The high radiometric performance of the detector's standard mode is best shown by four key parameters: Noise Equivalent Temperature Difference (NETD), Residual Non-Uniformity (RNU), pixel operability, and Image Quality. The measured NETD histogram at 50% well-fill is shown in FIG. 7. The measurement was performed using F/4 aperture with a 3.6 µm-4.9 µm cold filter in front of a 27° C. Extended Blackbody. Low NETD is reached as in standard SCD InSb detectors. In addition, the histogram of the NETD is symmetric around the mean value and has relatively narrow distribution. A 2D NETD distribution is presented in FIG. 8, which demonstrates high NETD uniformity with random distribution. The scale is in mK. FIG. 9 shows the RNU after 2-point correction for 20-80% well-fill capacity measured at different blackbody temperatures and constant integration time. Each point is an average of 64 consecutive frames. The RNU is presented in units of spatial Standard Deviation (STD) over the full dynamic range. As can be seen, the RNU in the regular imaging mode of the detector of the present invention is less than 0.03% STD/full range for signals in this range. This result demonstrates that a high quality image is achieved for a wide range of well fills. Finally, the pixel operability in the regular imaging mode of the detector of the present invention was measured using the same defect identification criteria as in standard InSb detectors. Such criteria include shorted and disconnected pixels, NETD defects, RNU defects, and other defective pixels which are not operating properly. Typical operability is better than 99.9%.

Figure 10:
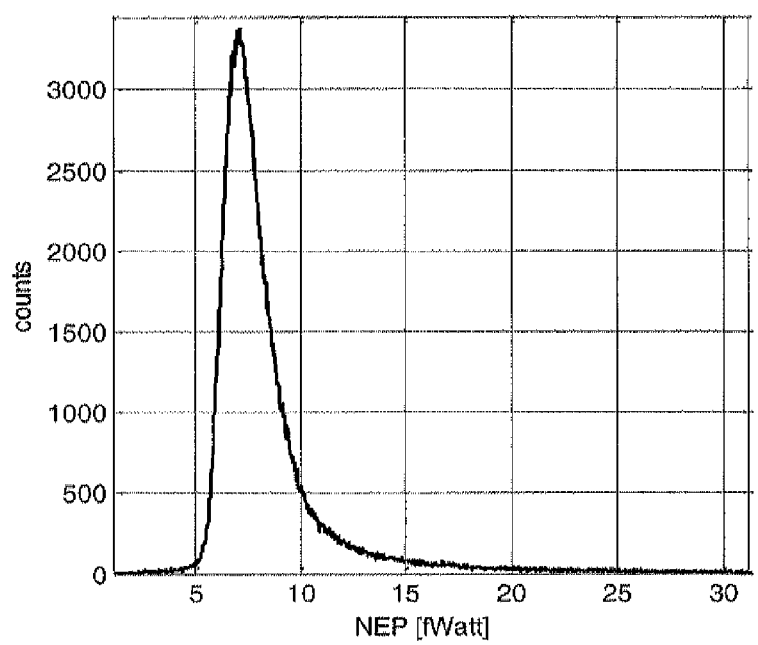
FIG. 10 presents a Noise Equivalent Power (NEP) histogram in the low noise imaging mode of the integrated readout circuit of the present invention.
Figure 11:
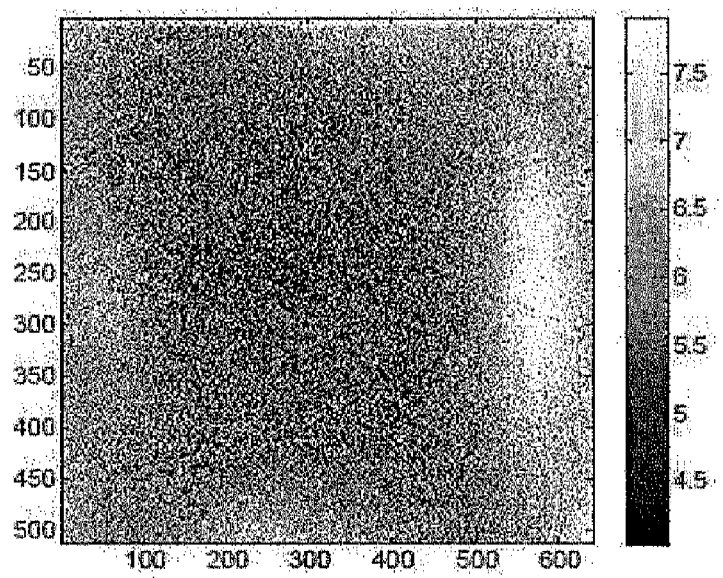
FIG. 11 presents a Noise Equivalent Temperature Power (NEP) 2D distribution in the low noise imaging mode of the integrated readout circuit of the present invention.
Figure 12:
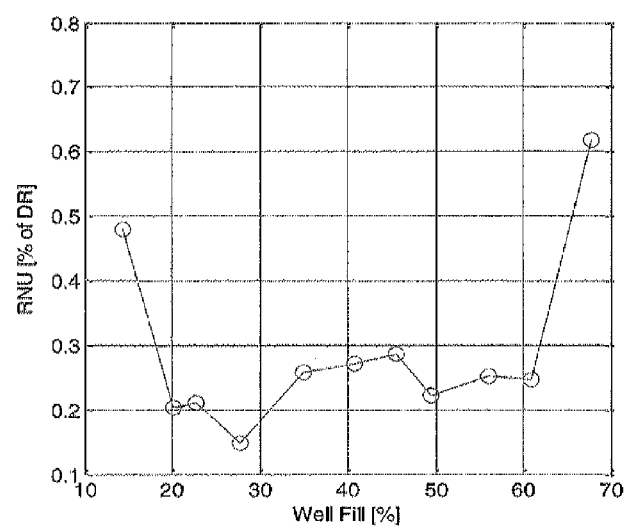
FIG. 12 presents a global Residual Non-Uniformity (RNU) in the low noise imaging mode of the integrated readout circuit of the present invention after a linear fit non-uniformity correction.
Figure 13:
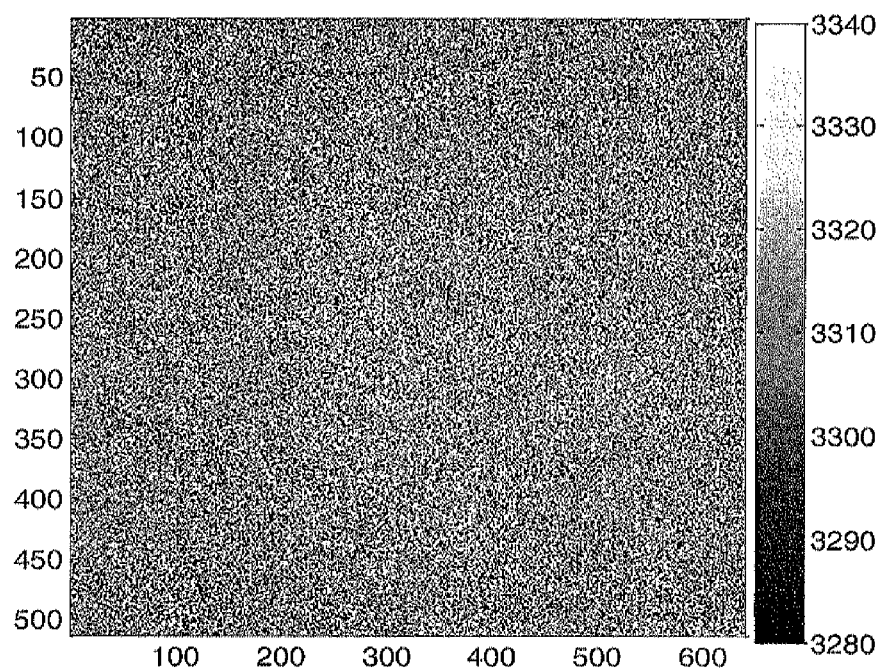
FIG. 13 presents a corrected image at 55% well fill for the low noise imaging mode of the integrated readout circuit of the present invention.

As described above, the LNIM mode is dedicated to very low light level imaging, so it can be used only if the MWIR radiation is blocked by the cold filter, or in active imaging with very short integration time. The dark current should be low compared to the photo-current. Very low dark currents of 35 fA per pixel were reached by operating the detector at a temperature of 68K. The radiometric performance of the passive (long integration time) LNIM mode is presented in FIGS. 10-13. All measurements were performed using a F/4 aperture and a 1.2-2.5 µm cold filter, while facing 1.5 µm uniform illumination at the output of an integrating sphere. For best performance, a pixel Correlated Double Sampling (CDS) was used. In this spectral range, the Noise Equivalent Power (NEP) is the key parameter which is used to define the sensitivity instead of NETD. A typical NEP histogram of the array is shown in FIG. 10 in which the integration time is 2 msec and its 2D distribution is presented in FIG. 11. In FIG. 12 the RNU of the LNIM after linear fit correction is shown, as a function of well fill capacity measured at different illumination levels and constant integration time. Each point is an average of 64 consecutive frames. The RNU is presented in units of STD over full dynamic range. The RNU in LNIM mode is less than 0.3% STD/full range for signals between 20-60% well-fill capacity. In FIG. 13 the corrected image in LNIM is presented, which shows "white spatial noise". The scale is in digital levels.

As already mentioned above, in the ALPD mode of operation, the detector produces simultaneously an IR image (up to 15 bits) and the pulse finder information (one additional bit) at every pixel. The two parameters for pulse detection in the ALPD mode are: False Alarm Rate (FAR) and pulse detection sensitivity. The FAR is defined as an average percentage of pixels per frame indicating arrival of a pulse when no pulse is present in the detector's FOV. ALPD sensitivity is the minimum pulse intensity per pixel where the detector is indicating an event in at least 90% of the frames. Both FAR and ALPD sensitivity can be tuned by the detector sensitivity threshold level, $v_{th}$. It enables increase in detector sensitivity in applications which can tolerate higher FAR level. Alternatively, it is possible to change the detector sensitivity according to the scene. For most applications, if working with multiple repetitive (laser) pulses, it will be easy to distinguish at the system level between a FAR and laser event, even with relatively high FAR level, due to the spatial and temporal distribution of the FAR pixels. No FAR clusters of pixels were found at any threshold level $v_{th}$, so laser spots that cover more than one pixel should be identified easily. Moreover, every pixel has its typical FAR level, the Pixel FAR (PFAR), which can be calibrated and stored in a memory table so a change in alarm rate should indicate a real event. Alternatively, FAR defects can be defined and marked and therefore the FAR level can be decreased dramatically.

Figure 14:
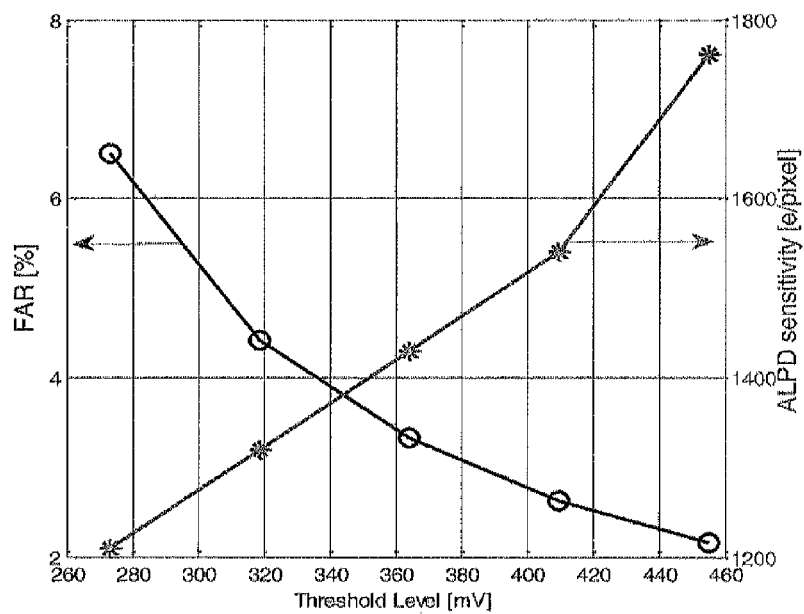
FIG. 14 presents a False Alarm Rate (FAR) and pulse detection sensitivity for the event detection mode of the integrated readout circuit of the present invention as a function of a threshold voltage ($v_{th}$)

FAR and sensitivity were measured as an average of 100 consecutive frames. Typical FAR levels are from 0.1% to 10% for the whole range of threshold levels $v_{th}$, and sensitivity is from 1000 e/pixel. FIG. 14 shows the FAR and median sensitivity as a function of $v_{th}$. The exponential decrease in FAR with threshold level is a typical behavior for Gaussian noise limited detection. The sensitivity of the pixel to light pulse (photon/pixel) can be calculated by the external quantum efficiency being ~0.8.

As already mentioned above, a widespread method to determine the distance to an object is by firing a laser pulse to the target and measuring the time duration, t, between transmission of the pulse and detection of the reflected signal. For example, the detector may be synchronized to the laser or vice versa. In the detector of the present invention, this is done by triggering a pulse generated by the system, which marks the start of the timer. At this stage of detector characterization, the testing is simplified by using the mode of synchronization, so the results presented here were performed when the detector was synchronizing the laser. The measurement setup includes laser, pulse generator, laser attenuator, beam splitter, fast diode for laser pulse monitoring, optics and laboratory Dewar. The pulse generator is triggered by a frame start pulse coming from the detector. It generates the signal at a given delay and with controlled pulse width. This signal is used to drive the 1.064 µm diode pulsed laser. The laser power was characterized by the LNIM active mode at every pixel, and the amplitude was controlled by the attenuator. Time of flight was measured by varying the laser pulse delay instead of a real distance. The time span was varied in discrete steps between 3-120 µsec.

Figure 15:
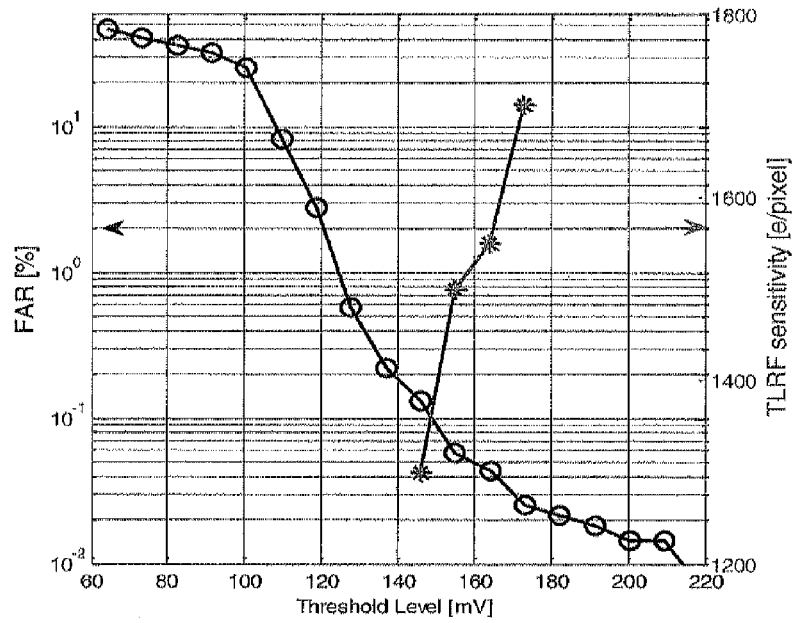
FIG. 15 presents a False Alarm Rate (FAR) and pulse detection sensitivity for the range finding mode of the integrated readout circuit of the present invention.

In the TLRF mode, FAR and sensitivity are defined in the same manner as in the ALPD mode. The same threshold level, $v_{th}$, as in the ALPD mode, controls the FAR and sensitivity in the TLRF mode. FIG. 15 shows the FAR and median TLRF sensitivity, measured for small time spans of 3 (or 6 µsec), vs. the threshold level, $v_{th}$. Larger time spans have FAR lower by 10%-20% for the same sensitivity.

Figure 16:
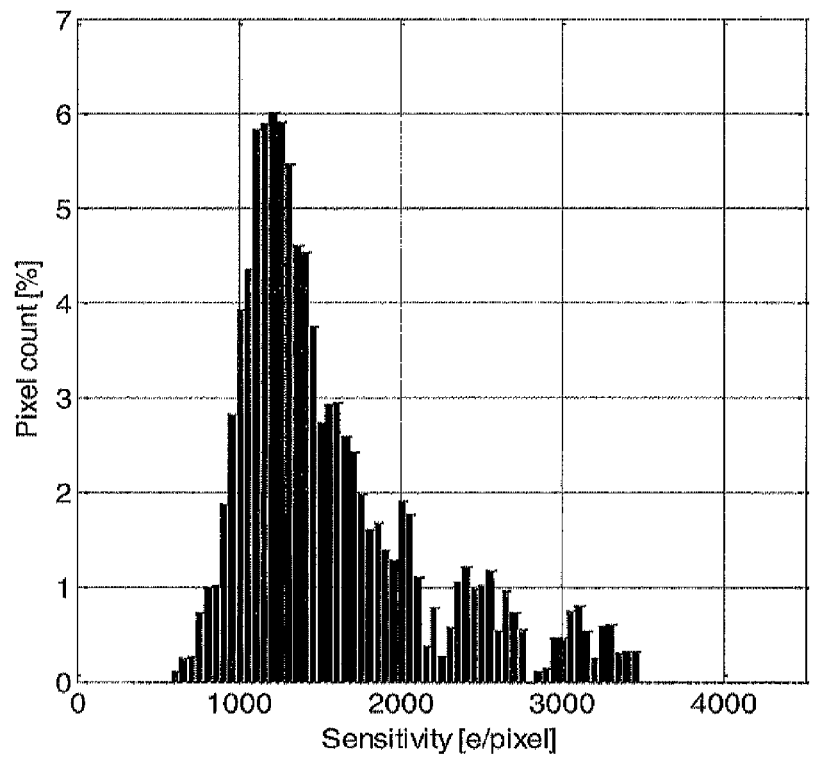
FIG. 16 presents a sensitivity histogram for time span of 30 µsec and FAR level of 0.2% for the range finding mode of the integrated readout circuit of the present invention.

For low $v_{th}$, the detector is very sensitive and almost all pixels are defined as False Alarms. When increasing $v_{th}$, FAR decreases exponentially, and so does its sensitivity. As in ALPD, also in TLRF mode, FAR defects can be defined and stored such that the FAR level can be decreased significantly. Typical TLRF sensitivity histogram for a time span of 30 µsec and FAR level of 0.2% is shown in FIG. 16.

Figure 17A:
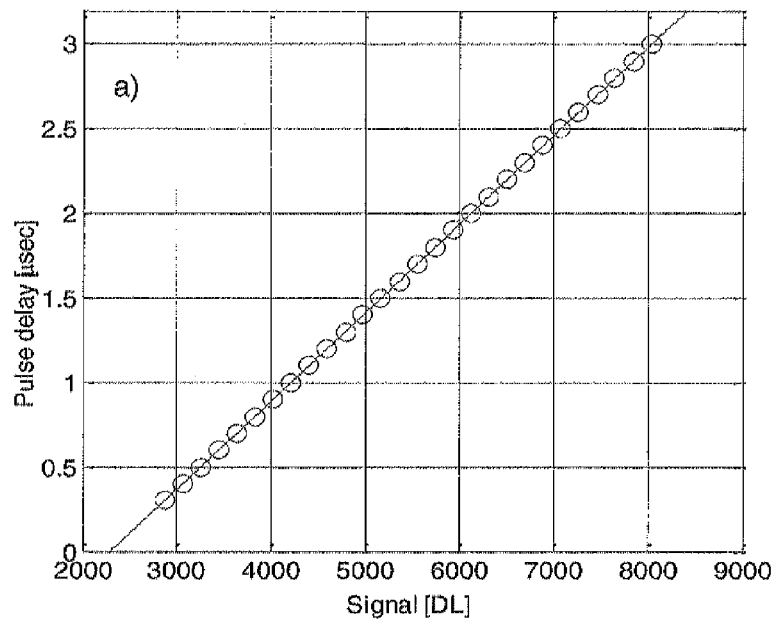
FIGS. 17A-17B present a laser pulse delay (17A) and the deviation from linear fit as a function of signal (17B) for the range finding mode of the integrated readout circuit of the present invention.
Figure 17B:
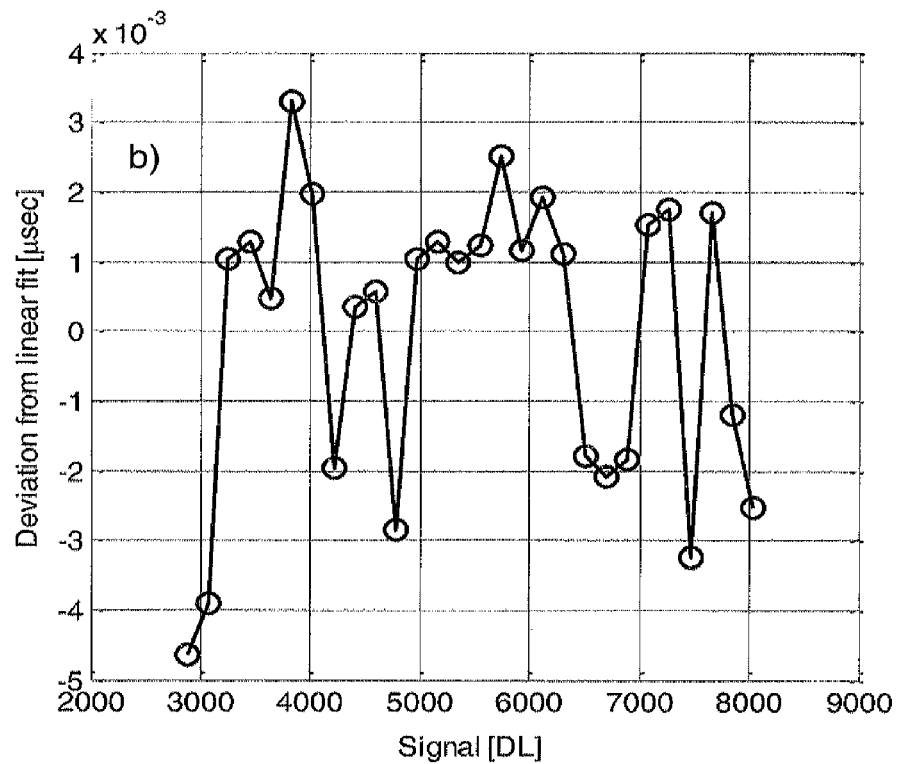

In the TLRF mode, the signal from the detector in Digital Levels (DL) is measured as a function of laser pulse delay for different time spans. For each time span, a new signal to range calibration is needed. Linear fit or standard two point correction can be used, but a quadratic fit improves the results, especially close to the end points. Reference is made to FIGS. 17A-17B representing a laser pulse delay (17A) and a deviation from linear fit (17B) as a function of the measured TLRF signal. It shows that the deviation from the linear fit is less than 3 nsec for the shortest time span of 3 µsec.

Figure 18:
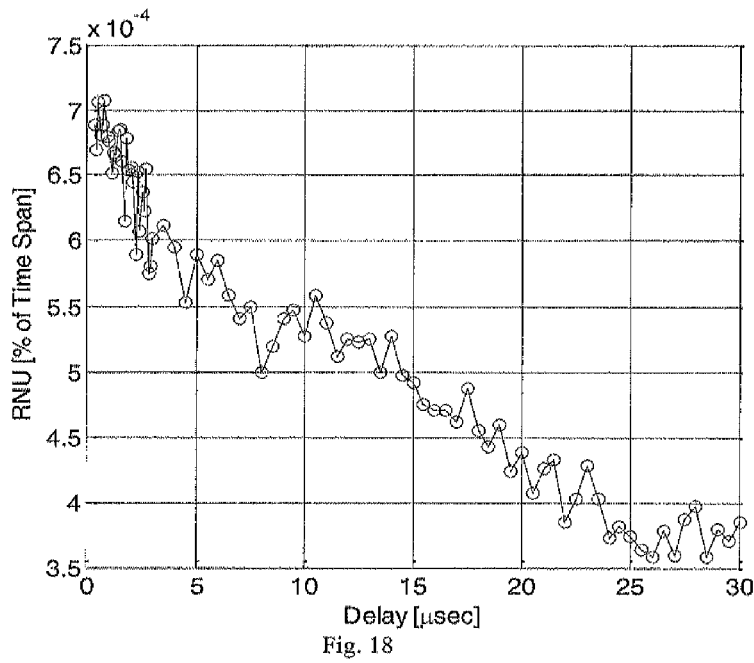
FIG. 18 presents a Residual Non-Uniformity as a function of time delay for the range finding mode of the integrated readout circuit of the present invention.
Figure 19:
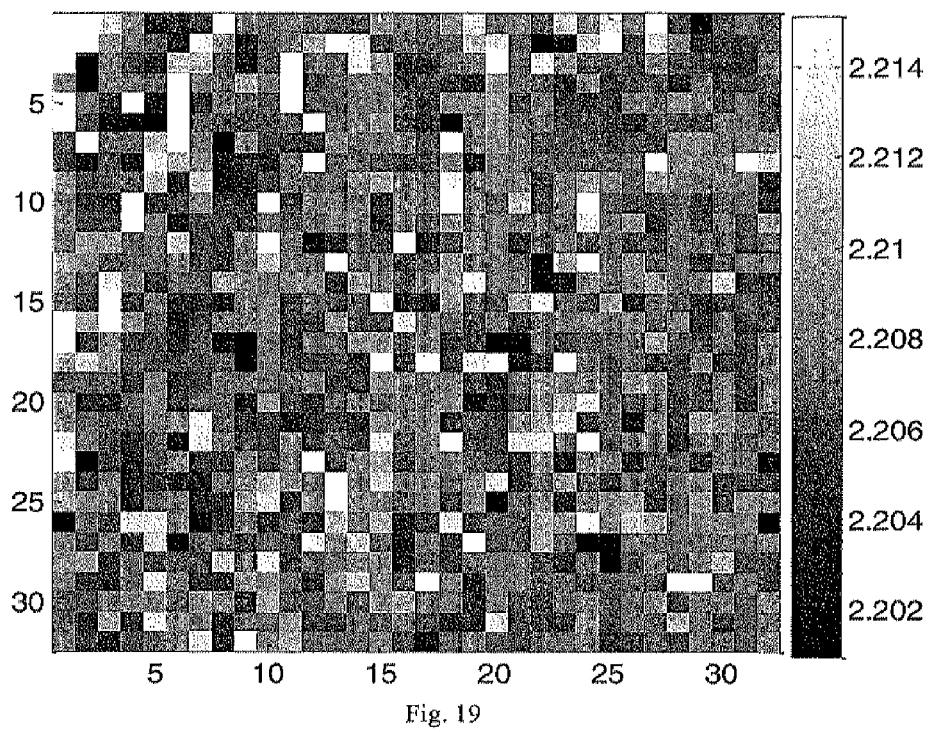
FIG. 19 presents a corrected 2D map of measured time delay for 2.2 µsec laser delay for the range finding mode of the integrated readout circuit of the present invention.

The spatial RNU was also calculated for the 32×32 pixel window for different time spans. The measurement and analysis procedure is as follows. First, a set of TLRF signal measurements as an average of 100 consecutive frames is recorded for different laser pulse delays. This set was used to find the quadratic fit for each pixel. Then, the fit was applied to the second set of measurements where only one frame was recorded every time. The RNU of the range was calculated as a spatial (2D) standard deviation of the corrected TLRF 2D map for every delay. FIG. 18 shows that the RNU is less than about 0.1% of the time span for the whole dynamic range for 3 µsec time span. For the shortest time span, the RNU is less than 3 nsec. FIG. 19 presents the corrected time 2D map of the shortest time span (3 µsec), for 2.2 µsec laser delay. The scale is in µsec and the time span is 3 µsec.

The detector signal was also measured as a function of the laser pulse intensity at the same laser pulse delay for pulses from 1000-20000 e/pixel. For the low laser pulse intensity below 5000 e/pixels, there is an additional delay caused by the change in pixel time response. If the intensity is not known, the uncertainty in the measured time of flight can be about 0.2% of the time span. For applications with repetitive laser pulses, the detector can be operated in the active LNIM/TLRF combined mode, and intensity measured by the active LNIM can be used to correct the additional delay at the low intensity pulses. Typically, this additional delay is proportional to the inverse of the laser pulse intensity. The following Table 1 summarizes the performance of the detector of the present invention in the TLRF mode,

TABLE 1

| TLRF mode performance | | | |
|---|---|---|---|
| Time Span [μsec]/ [km] | RNU [nsec]/[m] | Range Accuracy [nsec]/[m] | Range Accuracy for high or known laser pulse intensity [nsec]/[m] |
| 120 μsec | 80 nsec | ±150 nsec | ±60 nsec |
| 18 km | 12 m | ±22.5 m | ±9 m |
| 30 μsec | 25 nsec | ±50 nsec | ±20 nsec |
| 4.5 km | 3.75 m | ±7.5 m | ±3 m |
| 3 μsec | 3 nsec | ±9 nsec | ±2 nsec |
| 450 m | 0.45 m | ±1.35 m | ±0.3 m |

In order to achieve high range accuracy, one can use the larger time span (i.e. 120 μsec) in order to study the scene. Once a target is identified, the user can shift the operation to a small time span (3 μsec), such that the range accuracy of the measurement can reach 0.3 meters.

Therefore, the detector of the present invention preserves a high quality standard imaging in the MWIR together with new functionalities. It meets the challenge of implementing additional functions in the pixel on large format and small pitch ROIC. High functionality may be achieved by using 0.18 μm CMOS technology. The detector of the present invention enables the development of small and compact systems that include functions of an IR imager, laser range finder, laser designator finder and low light imager. The measured range accuracy of the laser range finder mode (TLRF) is competitive with the current commercial LRF and has an additional value of IR image and LRF signal spatial correspondence and target recognition. Moreover, for shorter time spans 2D accurate range map can be obtained by multiple laser pulses operation. Active LNIM synchronized to a pulsed laser can be used with very short integration times down to 5 μsec, and therefore can be used in parallel to other modes in the MWIR. Very low readout noise and dark current enables long integration time for the passive low light imager. Finally, the ALPD mode can be used to acquire IR image simultaneously with see-spot function to identify pulses from laser designators or any other fast events. Unlike the TLRF mode where the pulse duration should be less than 25 nsec for maximum sensitivity, the ALPD mode is sensitive to events duration of up to tens of μsec.

The invention claimed is:

1. A pixel readout circuit for use with a pixel array, said pixel readout circuit comprising:
an input channel for receiving a signal generated by the pixel and corresponding to a photocurrent of a photosensitive element of the pixel;
an output readout utility;
an electronic circuit interconnected between said input channel and said output readout utility; wherein said electronic circuit comprises a signal analyzer unit controllably linked to said input channel and connected to said output readout utility and configured and operable for performing event detection by analyzing an AC component of said signal generated by said pixel to identify a change in the photocurrent of the photosensitive element of the pixel signal, and upon detecting that the change in said photocurrent satisfies a predetermined condition, generating data indicative of a detected event readable via said output readout utility.

2. The pixel readout circuit of claim 1, comprising a control utility configured and operable for selectively linking said signal analyzer unit to the input channel.

3. The pixel readout circuit of claim 1, wherein said electronic circuit further comprises an image acquisition circuit configured and operable for performing image acquisition and comprising a capacitive unit including at least one capacitor controllably linked to said input channel and connected to said output readout utility for transmitting image data thereto, the image acquisition circuit being adapted for accumulating a charge corresponding to the intensity of the received signal generated by said pixel during a single frame period.

4. The pixel readout circuit of claim 3, wherein said electronic circuit is configured to selectively vary conversion gain of the capacitive unit to provide a selected integration time of charge accumulation by at least one capacitor during said single frame period, thereby selectively providing different image acquisition modes with respectively higher and lower signal to noise ratio of the pixel operation.

5. The pixel readout circuit of claim 3, wherein said electronic circuit comprises at least two electronic units, each being interconnected between said input channel and said output readout utility, which are common for all the electronic units, each electronic unit being configured and operable for carrying out a different mode by applying a different processing to at least a part of the same signal, the pixel readout circuit being therefore operable in at least two different modes, including said event detection and said image acquisition.

6. The pixel readout circuit of claim 5, comprising a switching assembly connected to said input channel and configured for selectively directing at least a part of said signal to one or more units of the electronic circuit.

7. The pixel readout circuit of claim 5, wherein at least one of the electronic units comprises said capacitive unit.

8. The pixel readout circuit of claim 5, wherein at least one of the electronic units comprises said signal analyzer unit.

9. The pixel readout circuit of claim 5, comprising a control utility configured and operable for selectively operating one or more of said plurality of electronic units.

10. The pixel readout circuit of claim 1, comprising a band pass filter and wherein the detection of the change in the photocurrent comprises utilizing said band pass filter adapted to filter at least a DC component of the signal generated by the pixel such that said change in the photocurrent, which corresponds to said event, is identified by detecting that the AC component of said photocurrent at a certain frequency band satisfies said predetermined condition.

11. The pixel readout circuit of claim 10, wherein said signal analyzer unit comprises a comparator connectable to said bandpass filter and configured and operable to determine that said change in the photocurrent satisfies said predetermined condition by measuring a voltage difference.

12. The pixel readout circuit of claim 11, wherein said signal analyzer comprises a flip-flop circuit connectable to said comparator and configured and operable to lock said data indicative of the detected event until it receives a reset signal; said electronic circuit being thereby configured and operable for performing said event detection asynchronously with said image acquisition.

13. The pixel readout circuit of claim 1, wherein said signal analyzer unit is configured and operable to determine a time profile of said change and generate data indicative of a distance to a location in the region of interest originating said detected event.

14. The pixel readout circuit of claim 13, wherein said signal analyzer unit comprises a time counter circuit measuring said time profile and generating data indicative of the distance by measuring a time of flight to the detected event.

15. A pixel readout circuit for use with an imaging pixel array, said readout circuit comprising:
an input channel for receiving an image signal corresponding to electrical output of a photosensitive element of said pixel;
an output readout utility;
a plurality of electronic units, each electronic unit being interconnected between said input channel and said output readout utility, each electronic unit being configured and operable for carrying out a different mode by applying a different processing to at least a part of the same signal, wherein each electronic unit is selectively operable in at least one of the following modes:
(a) regular imaging of a region of interest,
(b) low noise imaging characterized by significantly higher conversion gain of the electronic circuit and thus higher signal to noise ratio for relatively weak signals as compared to those of a regular imaging,
(c) detecting an event by detecting a change in a photocurrent of a photosensitive element of said pixel, and
(d) detecting an event, determining and registering the time of the event,
wherein said plurality of electronic units comprise the electronic unit operable for acquiring an image by at least one of modes (a) and (b) and the electronic unit operable for detecting the event by at least one of mode (c) and (d); wherein said detection of the event comprises analyzing an AC component of said signal generated by said pixel to identify a change in the photocurrent satisfying a predetermined condition;
a switching assembly comprising a plurality of switches, said switching assembly being connected to said input channel and controllably operable for selectively linking the input channel to one or more of the electronic units for selectively directing at least a part of said signal to one or more of the electronic units; and
a control system connected to said switching assembly and configured and operable to selectively activate one or more of the switches to perform the link between the input channel and said one or more of the different electronic units.

16. The pixel readout circuit of claim 15, wherein at least one of the electronic units (a) and (b) is an image acquision circuit configured and operable for performing image acquisition and comprises a capacitive unit comprising at least one capacitor, controllably linked to said input channel for accumulating a charge corresponding to intensity of the signal generated by said photosensitive element of the pixel during a single frame period, and connected to said output readout utility for transmitting data thereto.

17. The pixel readout circuit of claim 16, wherein at least one of said electronic units comprises a signal analyzer unit controllably linked to said input channel and connected to said output readout utility, and configured and operable for performing event detection by analyzing at least a part of said signal generated by said pixel and identifying a change in a photocurrent generated from said pixel corresponding to a received intensity, and upon detecting that the change satisfies a predetermined condition generating data indicative of detected event to said output readout utility.

18. The pixel readout circuit of claim 15, wherein said control system is configured to selectively vary conversion gain of a capacitive unit of at least one of said electronic units to provide a selected integration time of charge accumulation by at least one capacitor during a single frame period, thereby selectively providing different image acquisition modes with respectively higher and lower signal to noise ratio of the pixel operation.

19. The pixel readout circuit of claim 15, wherein at least one of said electronic units is configured and operable to acquire the image signal in a snapshot manner.

20. The pixel readout circuit of claim 15, wherein the determination and registration of the time of an event detected by the pixel is carried out simultaneously with at least one of said regular imaging of a region of interest and said event detection.

21. The pixel readout circuit of claim 15, wherein at least one of said electronic units comprises a signal analyzer unit controllably linked to said input channel and connected to said output readout utility and configured and operable for performing event detection by applying a bandpass filter to said photocurrent for filtering a DC component of said photocurrent, thereby enabling to analyze said AC component of said signal generated by said pixel to identify said change in the photocurrent generated from said pixel.

22. The pixel readout circuit of claim 21, wherein said signal analyzer unit is configured and operable to determine a time profile of said change and generate data indicative of a distance to a location in the region of interest originating said detected event.

23. The pixel readout circuit of claim 22, wherein said signal analyzer unit comprises an external time counter circuit measuring said time profile and generating data indicative of a distance by measuring the time of flight to the detected event.

24. The pixel readout circuit of claim 21, comprising a band pass filter, and wherein the detection of the change in the photocurrent comprises utilizing said band pass filter to filter a DC component of said photocurrent thereby enabling the detection of a variation in said AC component of said photocurrent at a certain frequency band.

25. The pixel readout circuit of claim 24, wherein said signal analyzer unit comprises a band pass filter and a comparator connectable thereto; said band pass filter being configured and operable to remove a DC component of said photocurrent such that said comparator determines the change in the photocurrent that is associated with variation in an AC component of said photocurrent.

26. A pixel readout circuit for use with a pixel array, said readout circuit comprising:
an input channel for receiving a signal corresponding to photocurrent output of a photosensitive element of a pixel of the pixel array;
an output readout utility;
a plurality of electronic units, each electronic unit being interconnected between said input channel and said output readout utility, wherein the electronic units are configured and operable to perform the following modes:
imaging a region of interest by integrating said signal over a certain integration time; and
performing synchronous event detection by analyzing an AC component of said signal generated by said pixel to identify a change in the photocurrent, which corresponding to intensity of radiation detected by the photosensitive element of the pixel, and if said change satisfies a predetermined condition, generate data indicative of the detected event, and store said data until receipt of a reset signal.

* * * * *